(12) United States Patent
Ohgushi

(10) Patent No.: US 9,048,769 B2
(45) Date of Patent: Jun. 2, 2015

(54) MOTOR DRIVING CIRCUIT AND MOTOR DRIVING SYSTEM

(71) Applicant: KABUSHIKI KAISHA TOSHIBA, Minato-ku, Toyko (JP)

(72) Inventor: Toshiaki Ohgushi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 139 days.

(21) Appl. No.: 13/758,509

(22) Filed: Feb. 4, 2013

(65) Prior Publication Data

US 2014/0021895 A1    Jan. 23, 2014

(30) Foreign Application Priority Data

Jul. 23, 2012   (JP) ................................ 2012-162780

(51) Int. Cl.
| | |
|---|---|
| *G05B 11/28* | (2006.01) |
| *H02P 6/14* | (2006.01) |
| *H02P 6/18* | (2006.01) |
| *H02P 6/20* | (2006.01) |

(52) U.S. Cl.
CPC ........ *H02P 6/14* (2013.01); *H02P 6/182* (2013.01); *H02P 6/205* (2013.01)

(58) Field of Classification Search
USPC ......... 318/138, 254, 439, 257, 281, 287, 291, 318/293, 696, 599, 268; 363/16, 17, 98
See application file for complete search history.

(56) References Cited

U.S. PATENT DOCUMENTS

| | | | | |
|---|---|---|---|---|
| 4,782,272 | A * | 11/1988 | Buckley et al. | 318/400.01 |
| 7,710,054 | B2 * | 5/2010 | Alberkrack et al. | 318/400.06 |
| 7,786,687 | B2 * | 8/2010 | Namuduri et al. | 318/400.09 |
| 2004/0047654 | A1 * | 3/2004 | Hayashi et al. | 399/208 |
| 2004/0164692 | A1 * | 8/2004 | Xi | 318/268 |

FOREIGN PATENT DOCUMENTS

| | | |
|---|---|---|
| JP | 2001-268960 A | 9/2001 |
| JP | 2005-086869 A | 3/2005 |
| JP | 2008-187838 A | 8/2008 |

* cited by examiner

*Primary Examiner* — Rina Duda
*Assistant Examiner* — Bickey Dhakal
(74) *Attorney, Agent, or Firm* — Holtz, Holtz, Goodman & Chick PC

(57) ABSTRACT

The motor driving circuit includes a first converting circuit that outputs an analog voltage proportional to a rotational speed of a motor, a differential voltage calculating circuit that calculates a differential voltage between the analog voltage and a rotation instruction voltage that prescribes the rotational speed of the motor and outputs a differential voltage signal including information on the differential voltage, a duty controlling circuit that outputs, based on the differential voltage signal, a duty controlling signal including information on a control duty that controls a duty of a PWM signal so as to bring the differential voltage between the rotation instruction voltage and the analog voltage close to zero, and a motor driving waveform controlling circuit that generates the PWM signal in response to a signal based on the duty controlling signal and that outputs the PWM signal.

18 Claims, 3 Drawing Sheets

MOTOR DRIVING CIRCUIT AND MOTOR DRIVING SYSTEM

CROSS-REFERENCE TO RELATED APPLICATION

This application is based upon and claims the benefit of priority from the prior Japanese Patent Application No. 2012-162780, filed on Jul. 23, 2012, the entire contents of which are incorporated herein by reference.

BACKGROUND

1. Field

Embodiments described herein relate generally to a motor driving circuit and a motor driving system.

2. Background Art

A conventional motor driving system includes a motor driving circuit, a motor and a rotation load. A rotation instruction pulse is input to the motor driving circuit through a rotation instruction input terminal, and the rotational speed of the motor is controlled according to the frequency of the rotation instruction pulse.

According to this configuration, the precision of the rotation instruction pulse has a direct effect on the precision of the rotational speed of the motor. Therefore, to control the rotation with high precision, the circuit that outputs the rotational speed instruction also has to have a precise oscillating circuit.

DETAILED DESCRIPTION

A motor driving circuit that controls driving of a motor with a PWM signal according to an embodiment includes a first converting circuit that outputs an analog voltage proportional to a rotational speed of the motor. The motor driving circuit includes a differential voltage calculating circuit that calculates a differential voltage between the analog voltage and a rotation instruction voltage that prescribes the rotational speed of the motor and outputs a differential voltage signal including information on the differential voltage. The motor driving circuit includes a duty controlling circuit that that outputs, based on the differential voltage signal, a duty controlling signal including information on a control duty that controls a duty of the PWM signal so as to bring the differential voltage between the rotation instruction voltage and the analog voltage close to zero. The motor driving circuit includes a motor driving waveform controlling circuit that generates the PWM signal in response to a signal based on the duty controlling signal and outputs the PWM signal.

In the following, embodiments will be described with reference to the drawings. The embodiments described below concern cases where the present invention is applied to control of a three-phase motor whose rotational speed is controlled by changing a three-phase driving voltage.

However, the present invention can be equally applied to other types of motors whose rotational speed is controlled by changing a driving voltage.

(First Embodiment)

Figure 1:
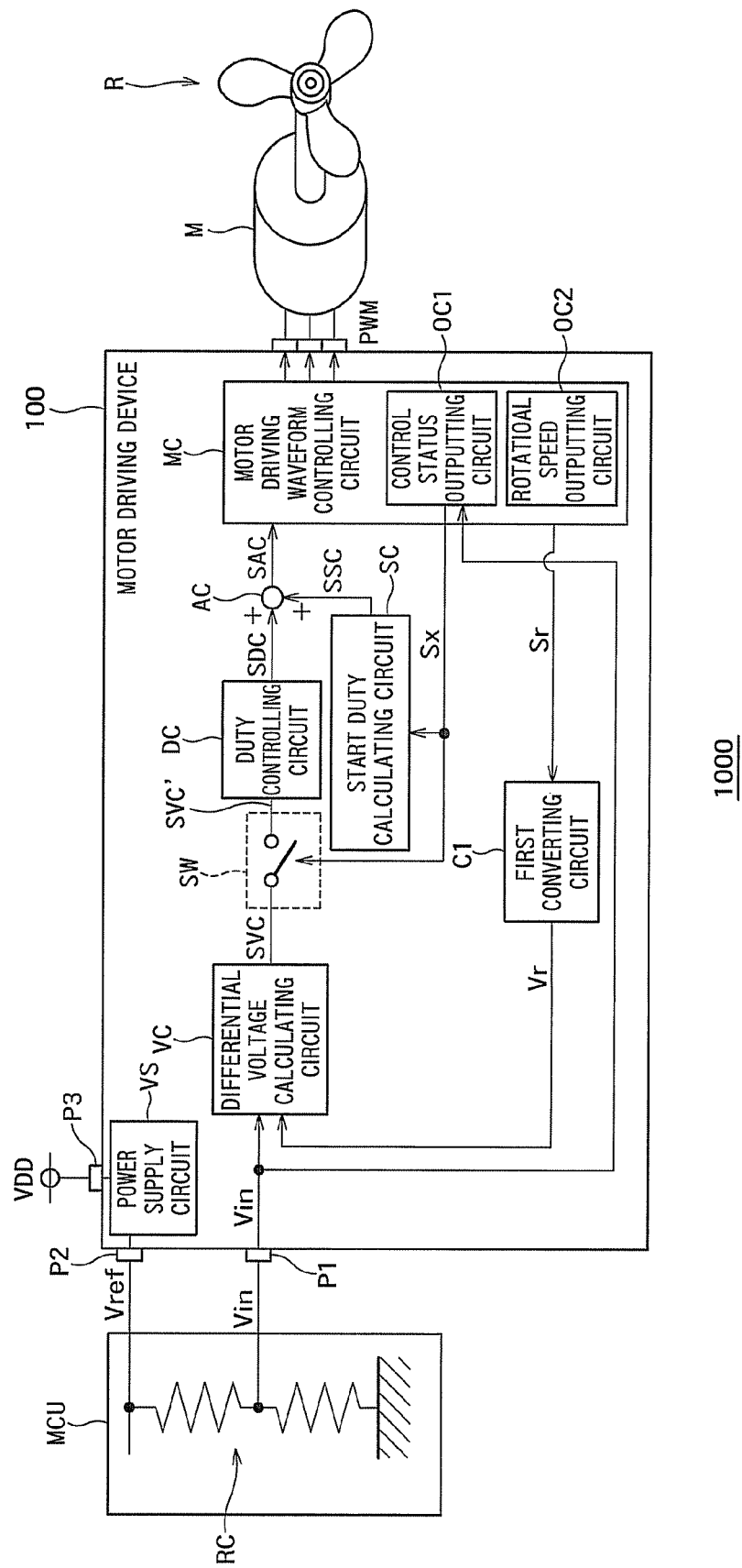
FIG. 1 is a diagram showing an example of a configuration of a motor driving system 1000 according to a first embodiment.

FIG. 1 is a diagram showing an example of a configuration of a motor driving system 1000 according to a first embodiment.

As shown in FIG. 1, the motor driving system 1000 includes an instruction circuit "MCU", a motor driving circuit 100 and a motor "M".

The motor driving system 1000 is used for driving a cooling fan (a rotation load "R") of a personal computer, for example.

According to this embodiment, the motor "M" is a three-phase motor. The motor "M" is configured to be driven by currents flowing through three-phase coils caused by a three-phase driving voltage. As described above, the motor "M" may be another type of motor whose rotational speed is controlled by changing the three-phase driving voltage.

The motor "M" includes a motor driver (not shown) that supplies a power supply voltage in the form of a three-phase driving voltage to the motor "M" in response to a pulse width modulation (PWM) signal output from the motor driving circuit 100.

The instruction circuit "MCU" is configured to output a signal that prescribes the rotational speed of the motor "M" (a rotation instruction voltage "Vin", for example).

The instruction circuit "MCU" includes a voltage dividing circuit "RC" that divides a reference voltage "VREF" and outputs the resulting divisional voltage as the rotation instruction voltage "Vin", for example.

The motor driving circuit 100 is configured to control driving of the motor "M" by controlling the motor driver with the PWM signal (or controlling the three-phase driving voltage (or driving current) to the motor "M") so as to make the motor "M" rotate at the rotational speed prescribed by the rotation instruction voltage "Vin" input from the instruction circuit "MCU".

That is, the motor driving circuit 100 is configured to control driving of the motor "M" with the PWM signal in response to the signal output from the instruction circuit "MCU".

As shown in FIG. 1, the motor driving circuit 100 includes a first port "P1", a second port "P2", a third port "P3", a first converting circuit "C1", a differential voltage calculating circuit "VC", a duty controlling circuit "DC", a start duty calculating circuit "SC", a switching circuit "SW", a motor driving waveform controlling circuit "MC", an adding circuit "AC", and a power supply circuit "VS", for example.

The first port "P1" is configured to receive the rotation instruction voltage "Vin" from the instruction circuit "MCU".

The third port "P3" is configured to receive a power supply voltage "VDD".

The power supply circuit "VS" is configured to output a fixed reference voltage "VREF" through the second port "P2" based on the power supply voltage "VDD" input thereto through the third port "P3". The reference voltage "VREF" is also supplied to the instruction circuit "MCU". As described above, the rotation instruction voltage "Vin" is a divisional voltage of the reference voltage "VREF".

The first converting circuit "C1" is configured to output an analog voltage "Vr" proportional to the rotational speed of the motor "M" based on a rotational speed signal "Sr". That is, the first converting circuit "C1" is configured to convert the frequency of a pulse signal into the analog voltage "Vr".

The first converting circuit "C1" is further configured to operate on the voltage supplied from the power supply circuit "VS".

As described above, the voltage supplied to the first converting circuit "C1" is generated from the reference voltage "VREF". Therefore, the analog voltage "Vr" output from the first converting circuit "C1" is not affected by a change of the power supply voltage "VDD".

The rotation instruction voltage "Vin" is a divisional voltage of the reference voltage "VREF". Therefore, the analog voltage "Vr" and the rotation instruction voltage "Vin" are also not affected by a change of the power supply voltage "VDD".

That is, since the instruction circuit "MCU" and the motor driving circuit 100 share a common power supply, the motor driving circuit 100 can more precisely operate to generate the PWM signal than in the case where the instruction circuit "MCU" and the motor driving circuit 100 use different power supplies.

The differential voltage calculating circuit "VC" is configured to calculate the differential voltage between the analog voltage "Vr" and the rotation instruction voltage "Vin" that prescribes the rotational speed of the motor "M" and output a differential voltage signal "SVC" that includes information on the differential voltage. For example, the differential voltage signal "SVC" is the differential voltage between the rotation instruction voltage "Vin" and the analog voltage "Vr".

The duty controlling circuit "DC" is configured to output, based on the differential voltage signal "SVC", a duty controlling signal that includes information on a control duty for controlling the duty of the PWM signal so as to bring the differential voltage between the rotation instruction voltage "Vin" and the analog voltage "Vr" close to zero.

For example, in the case where the differential voltage signal "SVC" is input to the duty controlling circuit "DC", the duty controlling circuit "DC" outputs a duty information signal "SDC" that includes information used for controlling the duty of the PWM signal so as to bring the differential voltage between the rotation instruction voltage "Vin" and the analog voltage "Vr" close to zero.

On the other hand, in the case where input of the differential voltage signal "SVC" is cut off, the duty controlling circuit "DC" stops updating of output of the duty information signal "SDC".

The motor driving waveform controlling circuit "MC" is configured to generate the PWM signal in response to a signal based on the duty controlling signal and output the PWM signal.

The start duty calculating circuit "SC" is configured to calculate a start duty of the PWM signal at the start of the motor "M" and output a start duty information signal "SSC" that includes information on the calculated start duty.

The start duty calculating circuit "SC" calculates the duty of the PWM signal at the start of the motor "M" in response to a control status signal "Sx".

For example, the start duty calculating circuit "SC" outputs the start duty information signal "SSC" that includes information on a first start duty in response to the control status signal "Sx" that indicates a control status of the motor "M" in which the motor "M" is direct-current excited by the PWM signal.

The start duty calculating circuit "SC" also outputs the start duty information signal "SSC" that includes information on a second start duty in response to the control status signal "Sx" that indicates a control status of the motor "M" in which the motor "M" is forced commutated by the PWM signal.

The start duty calculating circuit "SC" also outputs the start duty information signal "SSC" that includes information on a third start duty in response to the control status signal "Sx" that indicates a control status of the motor "M" in which the motor "M" is driven in a sensorless manner, which does not involve using a position sensor, by the PWM signal.

The switching circuit "SW" is connected between an output of the differential voltage calculating circuit "VC" and an input of the duty controlling circuit "DC". The switching circuit "SW" is configured to permit or block the passage of the differential voltage signal "SVC" from the differential voltage calculating circuit "VC" to the duty controlling circuit "DC" depending on the control status signal "Sx". In the drawing, for the sake of convenience, the differential voltage signal "SVC" passing through the switching circuit "SW" is denoted by "SVC".

For example, the switching circuit "SW" blocks input of the differential voltage signal "SVC" from the differential voltage calculating circuit "VC" to the duty controlling circuit "DC" in response to the control status signal "Sx" that indicates the control status of the motor "M" in which the motor "M" is direct-current excited by the PWM signal or the control status of the motor "M" in which the motor "M" is forced commutated by the PWM signal.

On the other hand, the switching circuit "SW" permits the passage of the differential voltage signal "SVC" from the differential voltage calculating circuit "VC" to the duty controlling circuit "DC" in response to the control status signal "Sx" that indicates the control status of the motor "M" in which the motor "M" is driven in a sensorless manner, which does not involve using a position sensor, by the PWM signal.

The adding circuit "AC" is configured to output a signal "SAC", which is the sum of the signal "SDC" output from the duty controlling circuit "DC" and the signal "SSC" output from the start duty calculating circuit "SC".

The motor driving waveform controlling circuit "MC" is configured to generate the PWM signal according to the signal "SAC" output from the adding circuit "AC" and output the PWM signal.

For example, the motor driving waveform controlling circuit "MC" generates the PWM signal having the first start duty in the control status in which the motor "M" is direct-current excited and outputs the PWM signal.

The motor driving waveform controlling circuit "MC" generates the PWM signal having the second start duty in the control status in which the motor "M" is forced commutated and outputs the PWM signal.

The motor driving waveform controlling circuit "MC" outputs the PWM signal having a duty that is the sum of the control duty and the third start duty in the control status in which the motor "M" is driven in a sensorless manner.

The motor driving waveform controlling circuit "MC" has a control status outputting circuit "OC1" and a rotational speed outputting circuit "OC2" as shown in FIG. 1, for example.

The control status outputting circuit "OC1" is configured to output the control status signal "Sx" that includes information on the control status of the motor "M".

The rotational speed outputting circuit "OC2" is configured to generate the rotational speed signal "Sr" responsive to the rotational speed of the motor "M" based on the PWM signal and output the rotational speed signal "Sr". The rotational speed signal "Sr" is a pulse signal whose frequency corresponds to the rotational speed of the motor "M", for example.

Next, an example of an operation of the motor driving circuit 100 having the configuration and functionality described above will be described.

For example, in the case where the motor "M" to be controlled has no position sensor, the position needs to be estimated from the back electromotive force, current or the like.

The S/N ratio of the back electromotive force or current is inadequate immediately after the motor "M" starts rotating or when the motor "M" is rotating at an extremely low speed. Therefore, the motor "M" is preferably forcedly accelerated by a rotating magnetic field having a certain acceleration until a certain rotational speed is reached.

To this end, for a certain period immediately after input of the rotation instruction voltage, no speed feedback control occurs, and the motor "M" is controlled with a previously determined duty.

Figure 2:
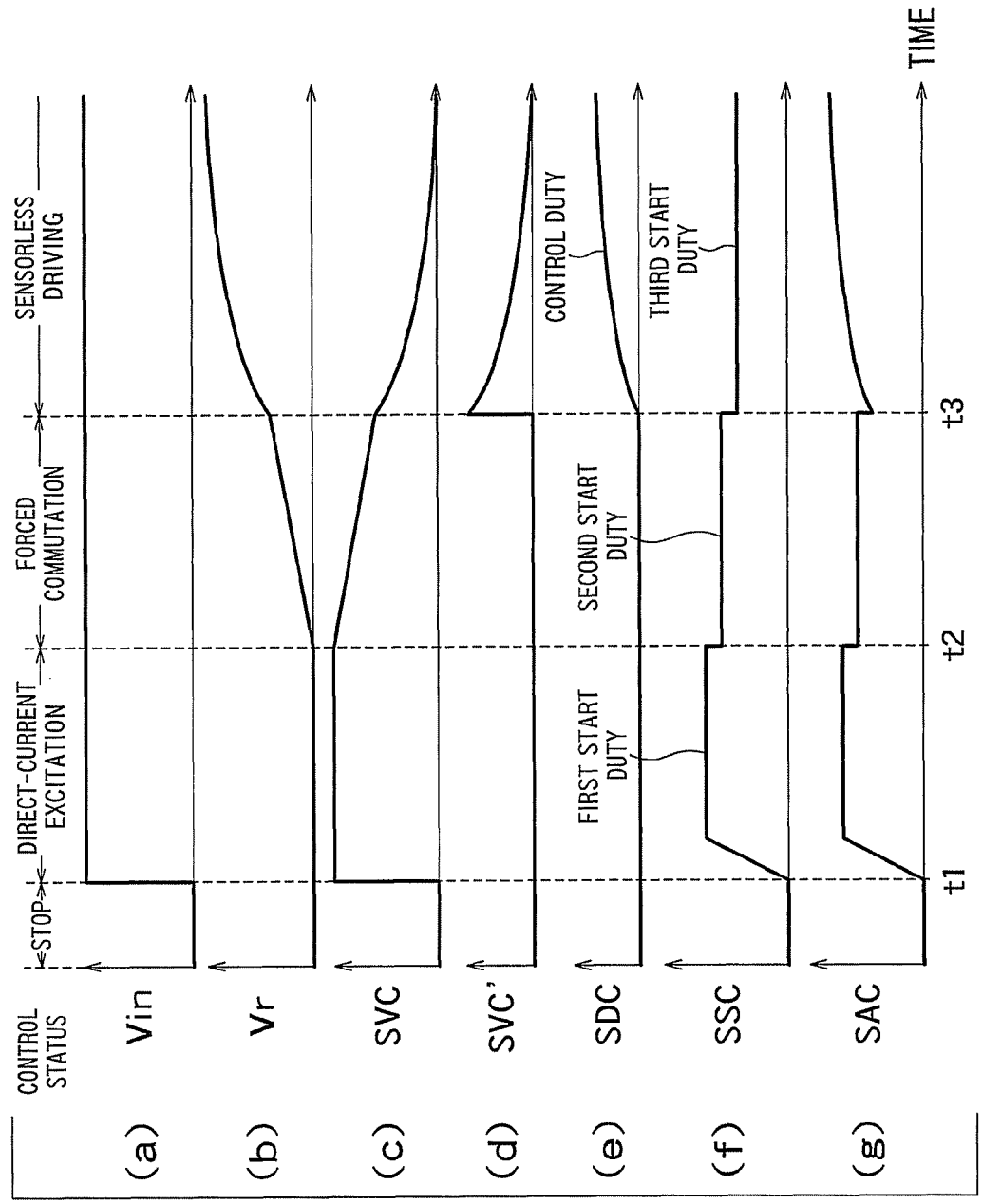
FIG. 2 is a waveform diagram showing an example of an operation waveform of the motor driving circuit 100 shown in FIG. 1.

FIG. 2 is a waveform diagram showing an example of an operation waveform of the motor driving circuit 100 shown in FIG. 1.

First, when the rotation instruction voltage "Vin" (see FIG. 2(a)) is applied, the motor driving waveform controlling circuit "MC" performs a direct-current excitation sequence for fixing the motor "M" at a particular position for a predetermined period (from a time t1 to a time t2). Since the motor "M" is fixed at a particular position, the analog voltage "Vr", which is proportional to the rotational speed of the motor "M", is 0 V (see FIG. 2(b)).

Meanwhile, the control status outputting circuit "OC1" outputs the control status signal "Sx" to notify the start duty calculating circuit "SC" and the switching circuit "SW" of the control status of direct-current excitation.

In response to this notification, the switching circuit "SW" is disconnected. As a result, the differential voltage signal "SVC" is not input to the duty controlling circuit "DC" (that is, the differential voltage signal "SVC" is 0) (see FIGS. 2(c) and 2(d)). As a result, the duty controlling circuit "DC" does not output the duty information signal "SDC" (the output is 0) (see FIG. 2(e)).

Note that the control duty of the duty controlling circuit "DC" is cleared to 0 when the rotation instruction voltage "Vin" is input (at the time t1).

On the other hand, the start duty calculating circuit "SC" increases the duty to the first duty and maintains the duty. As described above, the duty controlling circuit "DC" does not output the duty information signal "SDC" (the control duty is 0). Therefore, the adding circuit "AC" outputs the signal "SAC" that is equivalent to the start duty information signal "SSC" of the start duty calculating circuit "SC" to the motor driving waveform controlling circuit "MC" (see FIGS. 2(f) and 2(g)). Then, the motor driving waveform controlling circuit "MC" outputs the PWM signal to generate a fixed magnetic field responsive to the signal "SAC".

Then, the motor driving waveform controlling circuit "MC" performs a forced commutation sequence (from the time t2 to a time t3). More specifically, the motor driving waveform controlling circuit "MC" outputs the PWM signal to generate a magnetic field that rotates at a previously determined acceleration to forcedly rotate the motor "M". Since the rotational speed of the motor "M" increases to a predetermined value, the analog voltage "Vr", which is proportional to the rotational speed of the motor "M", also increases (see FIG. 2(b)).

Meanwhile, the control status outputting circuit "OC1" outputs the control status signal "Sx" to notify the start duty calculating circuit "SC" and the switching circuit "SW" of the forced commutation status.

The switching circuit "SW" is disconnected, the differential voltage is not input to the duty controlling circuit "DC" (see FIG. 2(d)), and the duty controlling circuit "DC" stops outputting the duty information signal "SDC" (that is, the control duty is 0) (see FIG. 2(e)).

On the other hand, the start duty calculating circuit "SC" continues to output the third start duty having a predetermined magnitude. The control duty of the duty controlling circuit "DC" is 0 (see FIG. 2(e)). As a result, the adding circuit "AC" outputs the signal "SAC" that is equivalent to the start duty information signal "SSC" of the start duty calculating circuit "SC" to the motor driving waveform controlling circuit "MC" (see FIGS. 2(f) and 2(g)). Then, the motor driving waveform controlling circuit "MC" outputs the PWM signal to generate a rotating magnetic field responsive to the signal "SAC".

Then, when a predetermined rotational speed of the rotating magnetic field is reached, the motor driving waveform controlling circuit "MC" performs a sensorless driving sequence (from the time t3). More specifically, the motor driving waveform controlling circuit "MC" outputs a motor position estimated from the back electromotive force or current of the motor "M" from the rotational speed outputting circuit "OC2" and performs a speed feedback control according to the rotation instruction voltage "Vin".

Meanwhile, the control status outputting circuit "OC1" outputs the control status signal "Sx" to notify the start duty calculating circuit "SC" and the switching circuit "SW" of the control status of sensorless driving.

The switching circuit "SW" is connected, the differential voltage is input to the duty controlling circuit "DC" (see FIG. 2(d)), and the duty controlling circuit "DC" outputs the calculation result (see FIG. 2(e)).

On the other hand, the start duty calculating circuit "SC" outputs the third start duty. The signal "SAC", which is the sum of the duty information signal "SDC" (the control duty) of the duty controlling circuit "DC" and the start duty information signal "SSC" (the third start duty) of the start duty calculating circuit "SC", is input to the motor driving waveform controlling circuit "MC" (see FIGS. 2(f) and 2(g)). Then, the motor driving waveform controlling circuit "MC" outputs the PWM signal to generate a rotating magnetic field responsive to the signal "SAC".

For example, if the analog voltage "Vr" output from the first converting circuit "C1" is smaller than the rotation instruction voltage "Vin", the differential voltage is positive. Accordingly, the control duty of the duty controlling circuit "DC" increases (or the duty of the PWM signal increases), and the motor "M" is accelerated.

To the contrary, if the analog voltage "Vr" output from the first converting circuit "C1" is greater than the rotation instruction voltage "Vin", the differential voltage is negative. Accordingly, the control duty of the duty controlling circuit "DC" decreases (or the duty of the PWM signal decreases), and the motor "M" is decelerated.

That is, the speed feedback control is performed to make the value of the rotation instruction voltage "Vin" and the value of the analog voltage "Vr" output from the first converting circuit "C1" equal to each other (or to make the differential voltage 0).

As described above, the speed feedback control starts after the position estimation precision becomes adequate, so that a loss of synchronization at the start of the motor "M" can be avoided.

In addition, since the rotation instruction voltage "Vin" is a divisional voltage of the reference voltage "VREF" as described above, an instruction based on the analog voltage "Vr" can be issued with a relatively high precision, and the precision of control of the rotational speed of the motor "M" is improved.

As described above, the motor driving system according to the first embodiment improves the controllability of the rotational speed of the motor.

(Second Embodiment)

In a second embodiment, a case where an instruction circuit outputs a rotation instruction signal (a pulse signal) will be described.

Figure 3:
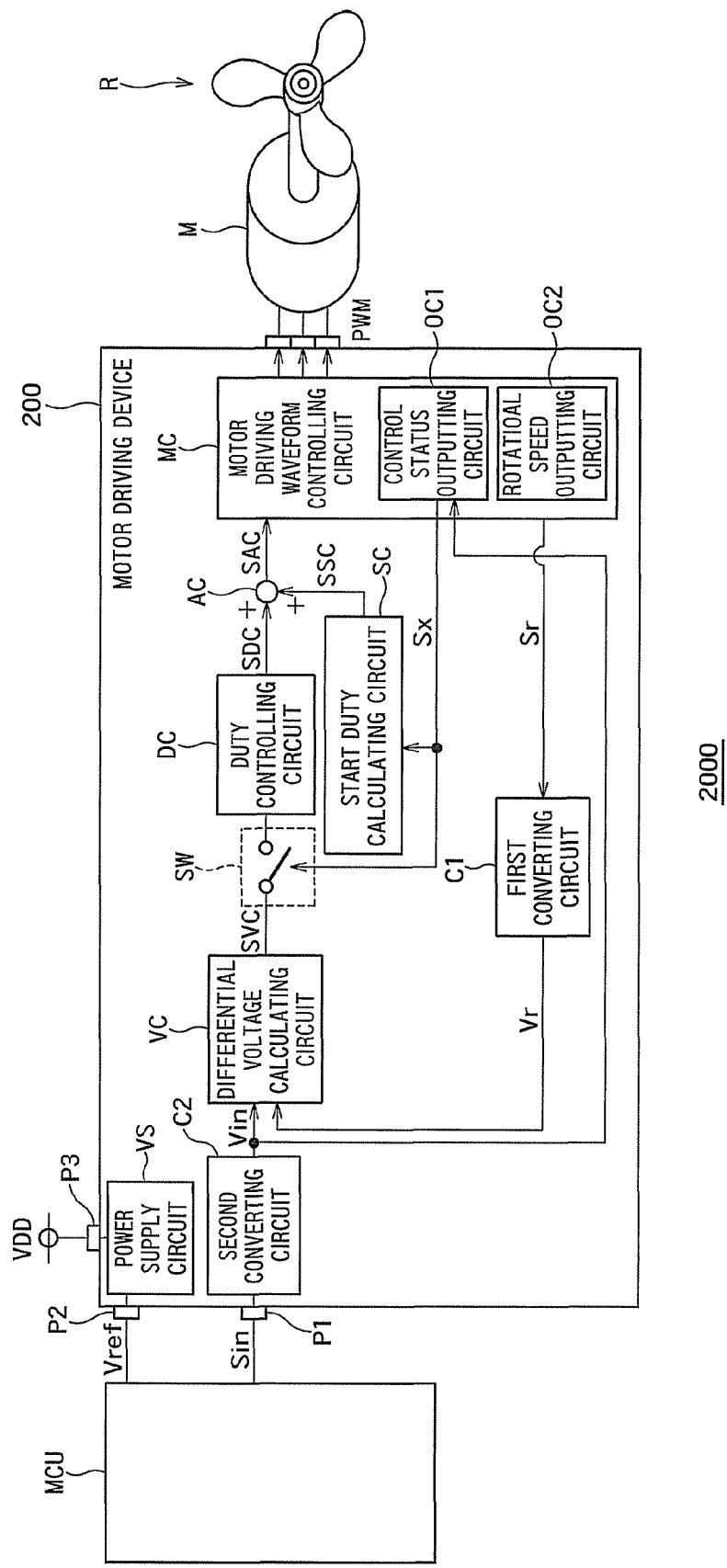
FIG. 3 is a diagram showing an example of a configuration of a motor driving system 2000 according to the second embodiment.

FIG. 3 is a diagram showing an example of a configuration of a motor driving system 2000 according to the second embodiment. In FIG. 3, the same reference symbols as those in FIG. 1 denote the same components as those according to the first embodiment.

As shown in FIG. 3, the motor driving system 2000 includes the instruction circuit "MCU", a motor driving circuit 200 and the motor "M".

The instruction circuit "MCU" is configured to output a signal that prescribes the rotational speed of the motor "M" (a rotation instruction signal (a pulse signal) "Sin", for example).

The motor driving circuit 200 is configured to control driving of the motor "M" by controlling the motor driver with the PWM signal (or controlling the three-phase driving voltage (or driving current) to the motor "M") so as to make the motor "M" rotate at the rotational speed prescribed by the rotation instruction signal "Sin" input from the instruction circuit "MCU".

That is, the motor driving circuit 200 is configured to control driving of the motor "M" with the PWM signal in response to the signal output from the instruction circuit "MCU".

As shown in FIG. 3, the motor driving circuit 200 includes the first port "P1", the second port "P2", the third port "P3", the first converting circuit "C1", a second converting circuit "C2", the differential voltage calculating circuit "VC", the duty controlling circuit "DC", the start duty calculating circuit "SC", the switching circuit "SW", the motor driving waveform controlling circuit "MC", the adding circuit "AC", and the power supply circuit "VS", for example.

That is, the motor driving circuit 200 is the motor driving circuit 100 according to the first embodiment that further includes the second converting circuit "C2".

As described above, the first port "P1" is configured to receive the rotation instruction signal (pulse signal) "Sin" that prescribes the rotational speed of the motor "M".

The second converting circuit "C2" is configured to convert the rotation instruction signal (pulse signal) "Sin" input through the first port "P1" into the rotation instruction voltage "Vin". The duty of the rotation instruction signal "Sin" corresponds to the specified rotational speed of the motor "M". For example, the second converting circuit "C2" converts the duty of the rotation instruction signal "Sin" into the rotation instruction voltage "Vin" corresponding to the duty and outputs the rotation instruction voltage "Vin". That is, the rotation instruction voltage "Vin" output from the second converting circuit "C2" prescribes the rotational speed of the motor "M" as in the first embodiment.

The second converting circuit "C2" may be a low-pass filter (LPF) that has a cut-off frequency sufficiently lower than the carrier frequency of the rotation instruction signal "Sin", for example. Alternatively, the second converting circuit "C2" may be configured to measure the ON time (the time between a positive edge and a negative edge) of a rotational speed instruction pulse and the pulse period with a high speed counter and D/A-convert the quotient thereof.

The pulse duty is the ratio between the ON time and the pulse period, and the influence of the precision of the oscillator can be cancelled, so that the precision of control of the rotational speed of the motor is improved.

The remainder of the configuration and functionality of the motor driving system according to the second embodiment is the same as that according to the first embodiment. That is, the motor driving system according to the second embodiment can improve the controllability of the rotational speed of the motor as in the first embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A motor driving circuit that controls driving of a motor with a PWM signal, comprising:

a first converting circuit that outputs an analog voltage proportional to a rotational speed of the motor;

a differential voltage calculating circuit that calculates a differential voltage between the analog voltage and a rotation instruction voltage that prescribes the rotational speed of the motor and outputs a differential voltage signal including information on the differential voltage;

a duty controlling circuit that that outputs, based on the differential voltage signal, a duty controlling signal including information on a control duty that controls a duty of the PWM signal so as to bring the differential voltage between the rotation instruction voltage and the analog voltage close to zero;

a motor driving waveform controlling circuit that generates the PWM signal in response to a signal based on the duty controlling signal and that outputs the PWM signal;

a start duty calculating circuit that calculates a start duty of the PWM signal at a start of the motor and that outputs a start duty information signal including information on the calculated start duty;

a switching circuit that is connected between an output of the differential voltage calculating circuit and an input of the duty controlling circuit and that one of permits and blocks a passage of the differential voltage signal from the differential voltage calculating circuit to the duty controlling circuit; and an adding circuit that adds the signal output from the duty controlling circuit and the signal output from the start duty calculating circuit and that outputs a resulting signal, wherein the motor driving waveform controlling circuit generates the PWM signal in response to the resulting signal output from the adding circuit and outputs the PWM signal.

2. The motor driving circuit according to claim 1, wherein:

the motor driving waveform controlling circuit comprising a control status outputting circuit that is configured to output a control status signal including information on a control status of the motor, the switching circuit blocks input of the differential voltage signal from the differential voltage calculating circuit to the duty controlling circuit in response to the control status signal, and the start duty calculating circuit calculates the start duty of the PWM signal at the start of the motor in response to the control status signal.

3. The motor driving circuit according to claim 2, wherein the duty controlling circuit:
outputs the duty controlling signal including information that is used to control the duty of the PWM signal so as to bring the differential voltage between the rotation instruction voltage and the analog voltage close to zero in a case where the differential voltage signal is input to the duty controlling circuit; and
stops updating output of the duty controlling signal in a case where input of the differential voltage signal is cut off.

4. The motor driving circuit according to claim 2, wherein the switching circuit:
cuts off input of the differential voltage signal from the differential voltage calculating circuit to the duty controlling circuit in response to a control status signal that indicates a control status in which the motor is direct-current excited by the PWM signal or a control status in which the motor is forced commutated by the PWM signal, and
permits the passage of the differential voltage signal from the differential voltage calculating circuit to the duty controlling circuit in response to a control status signal that indicates a control status in which the motor is driven in a sensorless manner by the PWM signal wherein driving the motor in the sensorless manner involves not using a position sensor.

5. The motor driving circuit according to claim 4,
wherein the start duty calculating circuit outputs the start duty information signal that includes information on a first start duty in response to the control status signal that indicates the control status of the motor in which the motor is direct-current excited by the PWM signal,
wherein the start duty calculating circuit outputs the start duty information signal that includes information on a second start duty in response to the control status signal that indicates the control status of the motor in which the motor is forced commutated by the PWM signal, and
wherein the start duty calculating circuit outputs the start duty information signal that includes information on a third start duty in response to the control status signal that indicates the control status of the motor in which the motor is driven in the sensorless manner by the PWM signal.

6. The motor driving circuit according to claim 5,
wherein the motor driving waveform controlling circuit generates the PWM signal having the first start duty in the control status in which the motor is direct-current excited and outputs the PWM signal,
wherein the motor driving waveform controlling circuit generates the PWM signal having the second start duty in the control status in which the motor is forced commutated and outputs the PWM signal, and
wherein the motor driving waveform controlling circuit outputs the PWM signal having a duty that is a sum of the control duty and the third start duty in the control status in which the motor is driven in the sensorless manner.

7. The motor driving circuit according to claim 1, wherein:
the motor driving waveform controlling circuit comprises a rotational speed outputting circuit that is configured to generate a rotational speed signal responsive to the rotational speed of the motor based on the PWM signal and output the rotational speed signal, and the first converting circuit outputs the analog voltage proportional to the rotational speed of the motor based on the rotational speed signal.

8. The motor driving circuit according to claim 1, wherein the differential voltage signal is the differential voltage between the rotation instruction voltage and the analog voltage.

9. The motor driving circuit according to claim 7, wherein the rotational speed signal is a pulse signal whose frequency corresponds to the rotational speed of the motor.

10. A motor driving system, comprising:
a motor;
an instruction circuit that outputs a signal that prescribes a rotational speed of the motor; and
a motor driving circuit that controls driving of the motor with a PWM signal in response to the signal output from the instruction circuit, wherein the motor driving circuit comprises:
a first converting circuit that outputs an analog voltage proportional to the rotational speed of the motor;
a differential voltage calculating circuit that calculates a differential voltage between the analog voltage and a rotation instruction voltage that prescribes the rotational speed of the motor and outputs a differential voltage signal including information on the differential voltage;
a duty controlling circuit that that outputs, based on the differential voltage signal, a duty controlling signal including information on a control duty that controls a duty of the PWM signal so as to bring the differential voltage between the rotation instruction voltage and the analog voltage close to zero;
a motor driving waveform controlling circuit that generates the PWM signal in response to a signal based on the duty controlling signal and that outputs the PWM signal;
a start duty calculating circuit that calculates a start duty of the PWM signal at a start of the motor and that outputs a start duty information signal including information on the calculated start duty;
a switching circuit that is connected between an output of the differential voltage calculating circuit and an input of the duty controlling circuit and that one of permits and blocks the passage of the differential voltage signal from the differential voltage calculating circuit to the duty controlling circuit; and
an adding circuit that adds the signal output from the duty controlling circuit and the signal output from the start duty calculating circuit and that outputs a resulting signal,
wherein the motor driving waveform controlling circuit generates the PWM signal in response to the signal output from the adding circuit and outputs the PWM signal.

11. The motor driving system according to claim 10, wherein:
the motor driving waveform controlling circuit comprising a control status outputting circuit that is configured to output a control status signal including information on a control status of the motor,
the switching circuit blocks input of the differential voltage signal from the differential voltage calculating circuit to the duty controlling circuit in response to the control status signal, and
the start duty calculating circuit calculates the start duty of the PWM signal at the start of the motor in response to the control status signal.

12. The motor driving system according to claim 11, wherein the duty controlling circuit:
  outputs the duty controlling signal including information that is used to control the duty of the PWM signal so as to bring the differential voltage between the rotation instruction voltage and the analog voltage close to zero in a case where the differential voltage signal is input to the duty controlling circuit; and
  stops updating output of the duty controlling signal in a case where input of the differential voltage signal is cut off.

13. The motor driving system according to claim 11, wherein the switching circuit:
  cuts off input of the differential voltage signal from the differential voltage calculating circuit to the duty controlling circuit in response to a control status signal that indicates a control status in which the motor is direct-current excited by the PWM signal or a control status in which the motor is forced commutated by the PWM signal, and
  permits the passage of the differential voltage signal from the differential voltage calculating circuit to the duty controlling circuit in response to a control status signal that indicates a control status in which the motor is driven in a sensorless manner, by the PWM signal, wherein driving the motor in the sensorless manner involves not using a position sensor.

14. The motor driving system according to claim 13, wherein the start duty calculating circuit outputs the start duty information signal that includes information on a first start duty in response to the control status signal that indicates the control status of the motor in which the motor is direct-current excited by the PWM signal,
  wherein the start duty calculating circuit outputs the start duty information signal that includes information on a second start duty in response to the control status signal that indicates the control status of the motor in which the motor is forced commutated by the PWM signal, and
  wherein the start duty calculating circuit outputs the start duty information signal that includes information on a third start duty in response to the control status signal that indicates the control status of the motor in which the motor is driven in the sensorless manner by the PWM signal.

15. The motor driving system according to claim 14,
  wherein the motor driving waveform controlling circuit generates the PWM signal having the first start duty in the control status in which the motor is direct-current excited and outputs the PWM signal,
  wherein the motor driving waveform controlling circuit generates the PWM signal having the second start duty in the control status in which the motor is forced commutated and outputs the PWM signal, and
  wherein the motor driving waveform controlling circuit outputs the PWM signal having a duty that is a sum of the control duty and the third start duty in the control status in which the motor is driven in the sensorless manner.

16. The motor driving system according to claim 10, wherein:
  the motor driving waveform controlling circuit comprises a rotational speed outputting circuit that is configured to generate a rotational speed signal responsive to the rotational speed of the motor based on the PWM signal and output the rotational speed signal, and
  the first converting circuit outputs the analog voltage proportional to the rotational speed of the motor based on the rotational speed signal.

17. The motor driving system according to claim 10, wherein the differential voltage signal is the differential voltage between the rotation instruction voltage and the analog voltage.

18. The motor driving system according to claim 10, wherein the instruction circuit comprises a voltage dividing circuit that divides a reference voltage and that outputs a resulting divisional voltage as the rotation instruction voltage.

* * * * *